A. Weyermann.
Pipe Connection.
No. 95,621. Patented Oct. 5, 1869.
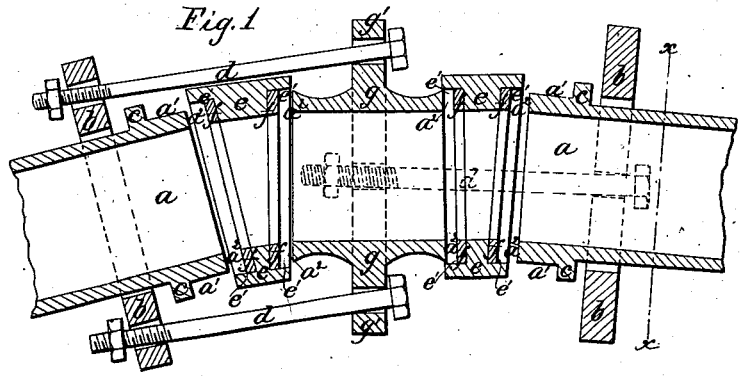
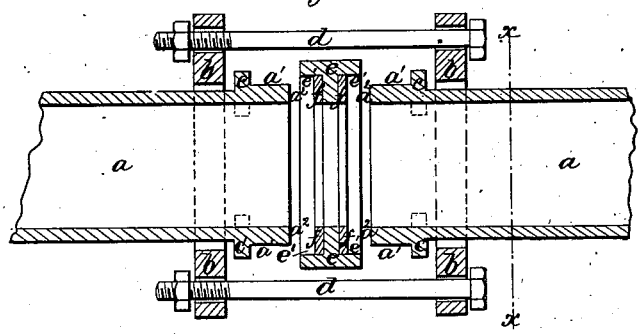
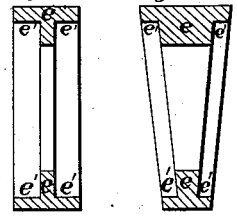 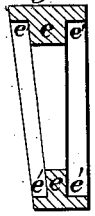 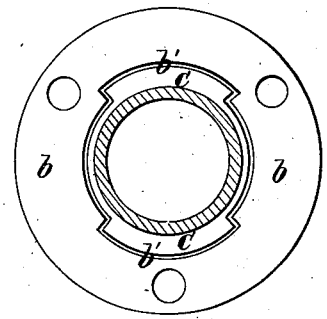
Witnesses:
Jacob Frey
Emile Hessler
Inventor:
Augustus Weyermann

United States Patent Office.

AUGUSTUS WEYERMANN, OF SAINT GALL, SWITZERLAND.

Letters Patent No. 95,621, dated October 5, 1869.

IMPROVEMENT IN PIPE-CONNECTIONS.

The Schedule referred to in these Letters Patent and making part of the same

*To all whom it may concern:*

Be it known that I, AUGUSTUS WEYERMANN, of Saint Gall, Switzerland, have invented a certain new and useful Method of, and Means for Uniting and Packing the Ends of Pipes and Tubes; and I do hereby declare that the following is a full and exact description thereof, reference being had to the accompanying drawing, forming a part of this specification.

My invention relates to means for coupling or connecting together the ends of water, steam, or gas-pipes, and is more especially adapted to large pipes or tubes, or such as are not less than one inch in diameter.

The object of the said invention is to provide a cheap, durable, and convenient method of securing together the ends of lengths or sections of pipes, arranged at any desired angle or inclination to each other, or in a continuous straight line.

Description of the Drawings.

Figure 1 is a longitudinal section, illustrating my method of coupling or connecting the ends of pipes, arranged obliquely or at an angle to each other.

Figure 2 is a similar section, illustrating the application of my invention to pipes arranged in a straight line with each other.

Figure 3 is a transverse section, on the line $x\,x$, figs. 1 and 2.

Figure 4 is a section of my improved coupling or connecting-piece for right-angled joints.

Figures 5 and 6 are sections of such connecting-pieces for oblique joints.

Like letters indicate the same parts throughout the drawing.

In practising my invention, I provide the ends of each pipe, or each length or section of pipe $a$, with a movable flange, $b$, which is kept in place by collars or projections $c$, on the end, or head $a'$ of each tube.

The collars $c$ extend only partially around the tube, and the loose flange $b$ is formed with recesses, or apertures $b'$, which, when brought opposite the collars, as shown in fig. 3, will pass over them, and which may be turned partially around behind the said collars, the flange being thereby securely held on the pipe.

By this means the flanges $b$ may be conveniently placed on the end of the pipe, or removed therefrom, and may be adjusted to receive the bolts $d$, whereby the pipes are secured together.

Between the two pipes or ends to be connected, I place an annular connecting-piece, or coupling, $e$, which is recessed on each side, to receive a ring, $f$, of India rubber, leather, or other suitable packing-material, against which the end of each pipe is bedded.

These connecting-pieces are made with their faces either at right angles to the bore of the pipes, as in fig. 4, or with one face, as in fig. 5, or both faces, as in fig. 6, oblique, or inclined at any desired angle to the same.

When these connecting-pieces $e$ are properly arranged between the ends of the pipes, the loose flanges $b$ are connected by the bolts and nuts, as shown in figs. 1 and 2, and by screwing down the said nuts the two ends of the pipe are drawn together, and made to bed closely on the packing-rings, thereby making the joint perfectly tight and secure.

In connecting inclined or oblique pipes, to form short curves, a short supplementary flanged piece, $g$, may be placed between two of the annular connecting-pieces, $e$.

The bolts $d$ are passed through the loose flanges $b$, and through the flange $g'$ of this supplementary piece, as seen in fig. 1.

The head, or end $a^1$ of each pipe, is preferably made somewhat larger in diameter than the intermediate part of the pipe, in order that there may be a sufficient area on the face $a^2$, in contact with the packing-ring $f$, to insure a tight joint and firm connection.

The bolt-holes in the flanges $b$ and $g'$ must be made far enough from their centre to let the bolt-heads and nuts be quite clear of the pipes, at whatever angle or inclination to each other the said pipes may be arranged.

In laying the pipes, or tubes, the different sections, by means of the oblique or inclined connecting-pieces, may be arranged at any desired angle, and by turning the said pieces, each part or section may be made to diverge or incline in either a horizontal, vertical, or intermediate direction.

The recesses $e'$, in the annular connecting-pieces $e$, must be so large that the ends of the pipes may be adjusted therein to any desired position, without touching the sides of the said recesses.

The inner diameter of the said connecting-pieces and of the packing-rings should not be less than the bore of the pipes.

The flange $g'$, of the intermediate pipe $g$, is provided with a double series of holes, to receive the bolts from the loose flanges on both sides of the said intermediate pipe; or the latter may be provided with a flange at each end.

A blank flange, or disk, provided with a packing-ring, may be used for closing the ends of the pipes and connections, and the said flange may be secured upon the end of the said pipes or connections without the annular connecting-piece.

The outer diameter of the packing-rings $f$ should be equal to that of the recess $e'$ in the connecting-piece $e$.

Leather packing-rings should be used for cold-water pipes, but for steam-pipes I prefer to make the said packing-rings of vulcanized India rubber.

It is obvious that my invention may be applied to elbow and T-pieces, bent pieces, cocks, and other joints and connections.

For convenience, the connecting-bolts or screws $d$ should be made of four different lengths, and they must be of such a diameter as to pass freely through the holes in the flanges of the pipes to be connected thereby, at whatever angle the said pipes may be placed to each other.

What I claim, and desire to secure by Letters Patent, is—

1. The pipe $a$, provided with segmental lips, or flanges, in combination with the removable collar $b$ and bolts $d$.

2. The pipe $a$, provided with segmental lips, or flanges, in combination with the collar $b$, connecting-piece $e$, and bolts $d$.

3. The pipe $a$, provided with segmental lips, in combination with the collar $b$, connecting-piece $c$, intermediate piece $g$, and bolts $d$.

AUGUSTUS WEYERMANN. [L. S.]

Witnesses:
JACOB TIER,
EL. KESSLER.